United States Patent [19]

Baugh

[11] Patent Number: 4,729,045
[45] Date of Patent: Mar. 1, 1988

[54] APPARATUS AND METHOD FOR DIGITAL MAGNETIC RECORDING AND READING

[75] Inventor: Richard A. Baugh, Palo Alto, Calif.

[73] Assignee: Hewlett-Packard Company, Palo Alto, Calif.

[21] Appl. No.: 847,089

[22] Filed: Apr. 1, 1986

[51] Int. Cl.$^4$ .............................................. G11B 5/09
[52] U.S. Cl. .......................................... 360/53; 360/46
[58] Field of Search .................... 360/46, 53, 67, 31

[56] References Cited

U.S. PATENT DOCUMENTS

| | | | |
|---|---|---|---|
| 3,740,736 | 6/1973 | Dion et al. | 360/53 |
| 4,480,276 | 10/1984 | Batey et al. | 360/46 |
| 4,495,529 | 1/1985 | Gustafson | 360/46 |
| 4,564,870 | 1/1986 | Kitamura | 360/46 |

Primary Examiner—Vincent P. Canney
Attorney, Agent, or Firm—Leslie G. Murray

[57] ABSTRACT

Magnetic recording and reading apparatus and a method in which two modes of operation, read-after-write and read-only, for setting read signal amplitude qualification threshold are provided. In the read-after-write mode, a fixed amplitude qualification threshold is utilized, typically being fifty percent of the peak amplitude of a perfect dropout-free read signal. The read-only mode amplitude qualification threshold is derived from the average peak rectified read signal, and varies with it. The threshold is selected to provide that fraction of the average peak rectified read signal which gives the lowest acceptable dropout or error rate.

6 Claims, 3 Drawing Figures

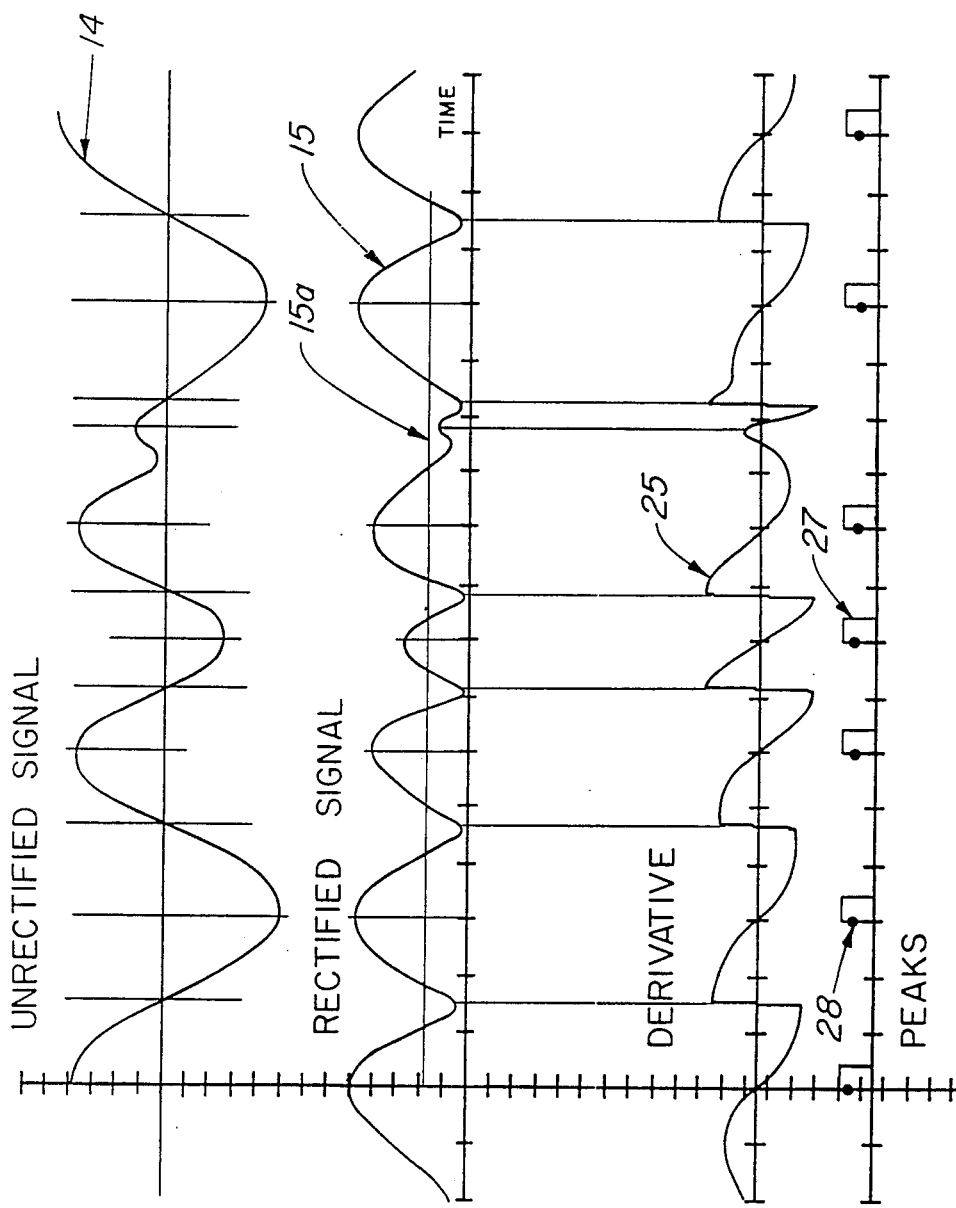

APPARATUS AND METHOD FOR DIGITAL MAGNETIC RECORDING AND READING

TECHNICAL FIELD

This invention relates generally to an apparatus and method for digital magnetic recording and reading and, more particularly, to optimum amplitude qualification threshold selection in magnetic recording and reading operations.

BACKGROUND ART

The rejection of faulty tracks on a tape is usually done under conditions which allow regions of marginal performance to go undetected. On subsequent data readouts these regions of marginal performance cause signal dropouts resulting in significant data errors. Signal dropouts are due to such factors as tape contamination or localized imperfections in the magnetic layer of the tape. Such dropouts require re-recording if data errors are to be avoided. Signal dropouts may also occur during successive reading attempts. Thus, even though an error due to signal dropout is detected and re-recording attempted, if adequate read threshold control is not provided successive read attempts may still result in marginal performance.

DISCLOSURE OF THE INVENTION

This invention describes a method and an apparatus in which two modes of operation are provided for setting amplitude qualification threshold. One is a read-after-write mode of operation and the other is a read-only operation.

In the read-after-write operation, reading is accomplished under the control of an amplitude qualification signal level threshold which is fixed at a relatively high percentage of the peak signal level. Conventional amplitude thresholds are in the neighborhood of thirty and sometimes as high as fifty percent of maximum recorded signal amplitude for read operations. The present invention utilizes an amplitude qualification signal level threshold which is fixed at about fifty percent of the value it would have for a perfect dropout free tape for read-after-write operation. During read-only operations the threshold is made equal to a fraction of the full wave rectified read signal which gives a minimum error rate in reading. This read signal level amplitude qualification threshold is derived from the rectified read signal itself and varies as a percentage of the varying amplitude of the read signal.

Tracks with marginal performance are rejected. By using the fixed theshold in the read-after-write mode the mechanism and overall quality of the tape are monitored. If too many tracks are rejected in the read-after-write mode, then either the recording medium is defective or the recording mechanism needs maintainance.

BRIEF DESCRIPTION OF THE DRAWINGS

FIG. 3 illustrates signal wave forms developed at differing points in the system of FIG. 2.

BEST MODE FOR CARRYING OUT THE INVENTION

This invention is described in connection with the magnetic recording of data on a tape as the tape moves past write and read transducers or heads. It is to be understood, however, that this invention is not limited strictly to the use of magnetic tapes as other magnetic media may be employed in practicing this invention.

Figure 1:
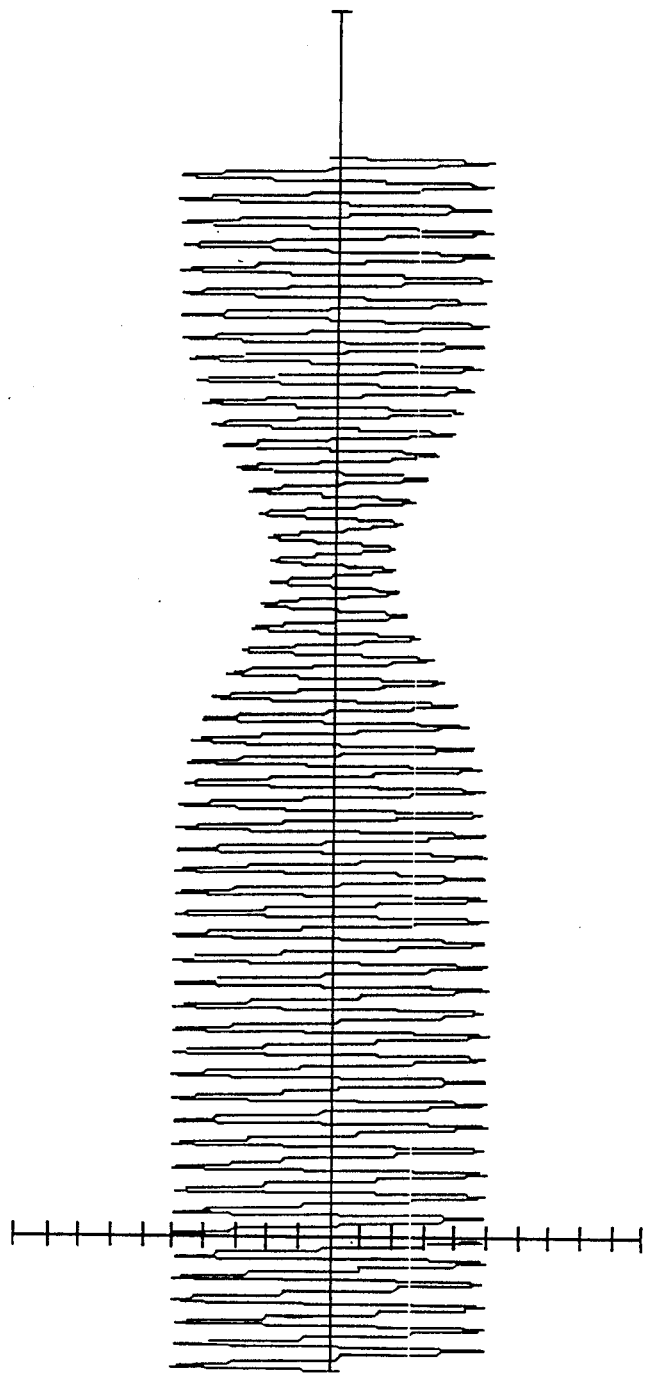
FIG. 1 depicts a read signal as produced by a read magnetic head, illustrating the appearance of a dropout.

The recording layers on magnetic media such as magnetic tape may contain defects or imperfections which cause momentary loss of signal at random times (dropouts) as illustrated in FIG. 1 which depicts a significant drop in signal amplitude. Data errors due to dropouts are eliminated by performing a read-after-write operation. Data is recorded on the tape in data blocks which is read in the sequence in which it is recorded and if a reading error is detected the data is then rewritten in a subsequent data block in the sequence of recording. In applications where a write head and a read head are disposed in spaced apart position along the path of movement of the tape, the data may be read immediately after it is written and, if there is an error, it is then rewritten in the next or subsequent data block.

In order to make a more stringent test of the presence of tape defects during the read-after-write operation, a data detection method is used which is very sensitive to diminution of the signal level. Thus any part of the tape which gives a marginal signal level on read-after-write causes errors and is rejected. During subsequent read operations, after the marginal tape locations have been rejected, the threshold detection electronics is automatically adjusted to a predetermined level to provide a minimum error rate.

Figure 2:
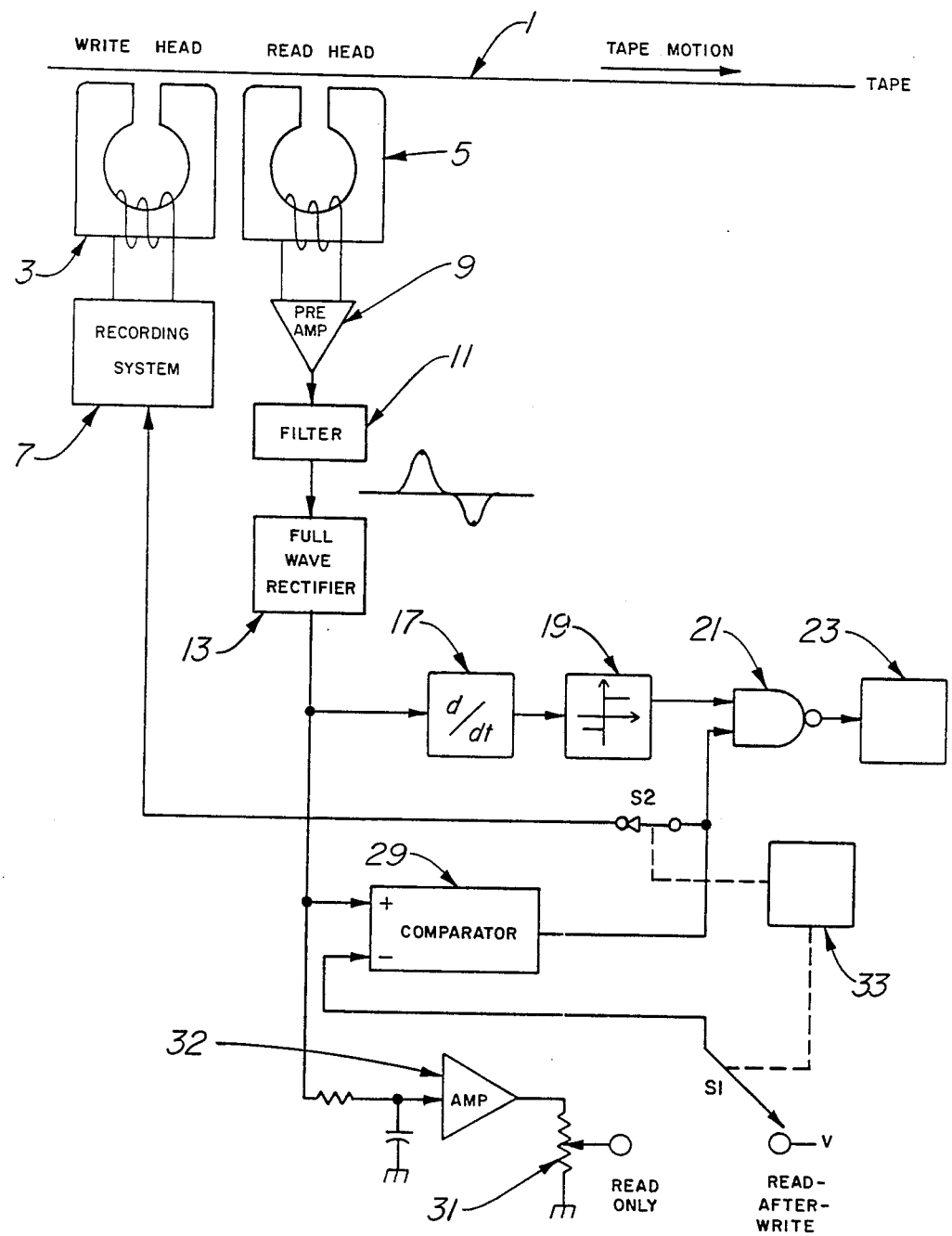
FIG. 2 is a block diagram of a presently preferred reading and recording apparatus embodying the principles of this invention.

Referring now to FIGS. 2 and 3, FIG. 2 is a block diagram which describes the implementation of the present invention. In FIG. 2, a magnetic tape 1 moves from left to right, as viewed, past a write head 3 and read head 5 which are disposed in spaced apart position along the path of movement of the magnetic tape 1. The write head 3 is controlled by a conventional recording system 7 for recording data patterns on the magnetic tape. This binary data is recorded by alternating the direction of magnetization along the recording track. Information is encoded along the tape into the positions of the transitions and not in the signal amplitude. This is desirable since the amplitude of the signal is much noisier than the positions of the magnetic transitions. The read-back signal which is induced in the coil of the read magnetic head 5 consists of a voltage pulse whenever the read head passes over one of the magnetic transitions. Read circuit means comprising a preamplifier 9, a filter 11 and a full wave rectifier 13, responds to this voltage pulse to produce a rectified read signal 15 which is processed. Processing circuits, comprising a differentiator 17 and a zero crossing detector circuit 19, produce a processed signal 27 which is coupled as input to a gating circuit 21. The output of the gating circuit 21 is coupled to a utilization circuit 23 which further decodes the signal in extracting the data information. Such utilization circuits 23 are conventional.

This system has two modes of operation. One is the read-after-write operation and the other is the read-only mode of operation. The wave forms of the signals associated with the read-after-write mode of operation of the system are depicted in FIG. 3. The unrectified read-back signal 14 is an alternating signal having positive or negative pulses which correspond to the magnetic transitions on the tape. Decoding of the rectified signal 15 as part of the signal processing operation, begins with the differentiator circuit 17 which, as seen in the derivative signal 25 of the rectified signal 15 in FIG. 3, locates the positions of the peaks of the rectified read signal 15. A peak is defined as a place where the signal derivative is zero and the amplitude exceeds the threshold level. The fixed threshold level which is used during the read-after-write operation is illustrated at 15a in FIG. 3. The rising or leading edge 28 of the square waves 27 produced by the zero crossing detector 19, in response to the derivative signal output of the differentiator 17, correspond on a one-to-one basis to the positive or negative peaks of the read back signal 14. Each rising edge 28 represents a magnetic transition on the tape. The use of amplitude qualification threshold levels is necessary to discriminate against noise pulses.

Selection of the two modes of system operation is achieved by a switch S1 here depicted as a mechanical switch for convenience, it being understood that solid state switching is preferred.

In these two modes of operation, differing amplitude qualification threshold levels are employed to produce an enabling signal, coupled as the second input to the gating circuit 21. The enabling signal is the output of a voltage comparator 29 which has a first input the rectified read signal 15 and as its second input the output of the mode switch S1. When the mode switch S1 is in the position shown, a fixed threshold voltage V is coupled as one imput to the voltage comparator 29. During the read-after-write mode of operation this fixed voltage establishes an amplitude qualification threshold which is fixed at a relatively high level. For example, as much as fifty percent of the value the average peak signal would have for a perfect, dropout-free tape. Thus when an imperfection in the tape causes the signal level to drop below fifty percent of normal, that region of the tape is rejected and the data is rewritten in the next data block. The other terminal of the mode switch S1 is connected to the adjustable tap of a potentiometer 31 which is coupled between the output of an amplifier 32 and ground, as illustrated. The rectified read signal 15 after low pass filtering is coupled as one input to the amplifier 32. Thus the read-only terminal of the mode switch S1 varies with the amplitude of the rectified read signal 15. The threshold of this amplification qualification signal is made equal to a fraction, 0.3 for example, of the full wave rectified signal. The selected fraction provides a minimum error rate during reading.

Writing on the magnetic tape is controlled by the recording system 7. During the read-after-write mode of operation whenever a read error is detected, the enabling signal output of the comparator 29 is used to cause the recording system to re-record the data signal. This is accomplished by means of a second switch S2 which is coupled between the output of the comparator 29 and the recording system 7. This switch S2 is closed whenever the mode switch S1 is in the position shown in FIG. 2, engaging the terminal having the fixed threshold voltage V. Switching is under the control of a mode selection circuit 33 which controls both the mode switch S1 and the switch S2.

INDUSTRIAL APPLICABILITY

The present invention, having two modes of operation for the amplitude qualification threshold, is generally applicable in all systems for recording and reading data on magnetic media.

I claim:

1. The method of recording and reading of a magnetic medium comprising:
   a. providing a read-after-write mode of operaton for recording and reading discrete magnetic recordings in a predetermined sequence;
   b. providing a fixed amplitude qualification signal level threshold at a predetermined percentage of the average dropout free amplitude;
   c. detecting each magnetic recording in said predetermined sequence and rejecting any magnetic recording which produces a read signal having an amplitude which is below the level of said fixed amplitude qualification signal level threshold;
   d. re-recording any rejected magnetic recording;
   e. providing a read-only mode of operation including producing a read signal from each discrete magnetic recording;
   f. producing a processed signal from said read signal; and
   g. producing an enabling signal from said read signal for controlling transmission of said processed signal.

2. The method according to claim 1, comprising additionally:
   a. producing a read threshold signal from said read signal; and
   b. comparing said read signal with said read threshold signal to produce said enabling signal.

3. Magnetic recording and reading apparatus comprising:
   a. a movable magnetic medium;
   b. a write transducer and a read transducer disposed in spaced apart positions along the path of movement of said magnetic medium so that said read transducer may detect magnetic recordings of said write transducer;
   c. read circuit means coupled to said read transducer for producing read signals;
   d. signal processing circuit means responsive to said read signals for producing processed signals;
   e. first means for producing a fixed amplitude threshold signal;
   f. second means responsive to said read signal for producing a read threshold signal;
   g. utilization circuit means;
   h. gating circuit means coupling said signal processing circuit means to said utilization circuit means; and
   i. control circuit means responsive to said fixed amplitude threshold signal during read-after-write operation for controlling said write transducer and responsive to said read threshold signal during read-only operation for controlling said gating circuit means.

4. Apparatus as set forth in claim 3, wherein said control circuit means comprises:
   a. a comparator having a first input connection for receiving said read signal, a second input connection and an output circuit connected to said gating circuit means; and
   b. switch circuit means selectively coupling said second input connection of said comparator to said first means and to said second means.

5. Apparatus as set forth in claim 4, comprising:
   a. a recording system connected to said write transducer for controlling said write transducer for producing discrete magnetic recordings on said movable magnetic medium; and b. means coupling said output circuit of said comparator to said recording system during read-after-write operation for controlling said recording system.

6. Apparatus as set forth in claim 5, wherein said last named means comprises:

a. switch circuit means connecting said output circuit of said comparator to said recording system during read-after-write operation.

* * * * *